United States Patent
Velayudhan et al.

(10) Patent No.: US 8,806,124 B2
(45) Date of Patent: Aug. 12, 2014

(54) METHODS AND STRUCTURE FOR TRANSFERRING OWNERSHIP OF A LOGICAL VOLUME BY TRANSFER OF NATIVE-FORMAT METADATA IN A CLUSTERED STORAGE ENVIRONMENT

(75) Inventors: Vinu Velayudhan, Fremont, CA (US); James A. Rizzo, Austin, TX (US); Basavaraj G. Hallyal, Fremont, CA (US); Guolin Huang, Sunnyvale, CA (US); Sumant K. Patro, Fremont, CA (US)

(73) Assignee: LSI Corporation, Milpitas, CA (US)

( * ) Notice: Subject to any disclaimer, the term of this patent is extended or adjusted under 35 U.S.C. 154(b) by 244 days.

(21) Appl. No.: 13/432,225

(22) Filed: Mar. 28, 2012

(65) Prior Publication Data
US 2013/0067163 A1 Mar. 14, 2013

Related U.S. Application Data

(60) Provisional application No. 61/532,585, filed on Sep. 9, 2011.

(51) Int. Cl.
*G06F 12/00* (2006.01)
*G06F 3/06* (2006.01)
*G06F 13/28* (2006.01)
*G06F 13/12* (2006.01)
*G06F 13/42* (2006.01)

(52) U.S. Cl.
CPC ...... *G06F 3/0683* (2013.01); *G06F 2206/1012* (2013.01); *G06F 3/0635* (2013.01); *G06F 3/0631* (2013.01); *G06F 3/067* (2013.01); *G06F 13/28* (2013.01); *G06F 13/423* (2013.01); *G06F 3/0613* (2013.01); *G06F 3/065* (2013.01); *G06F 13/12* (2013.01)
USPC .......................................... 711/114; 711/162

(58) Field of Classification Search
CPC ... G06F 13/12; G06F 13/28; G06F 17/30569; G06F 2206/1012; G06F 3/0613; G06F 3/0635; G06F 3/0683; G06F 11/1456; G06F 17/30917; G06F 3/0664; G06F 2201/815
USPC .................................................. 711/114, 162
See application file for complete search history.

(56) References Cited

U.S. PATENT DOCUMENTS 6,487,646 B1 11/2002 Adams et al.
6,651,154 B1 11/2003 Burton et al.

(Continued)

OTHER PUBLICATIONS

"Common RAID Disk Data Format Specification" Version 2.0 Revision 19 SNIA Technical Position Mar. 27, 2009.

(Continued)

*Primary Examiner* — Hashem Farrokh
(74) *Attorney, Agent, or Firm* — Duft Bornsen & Fettig (57) ABSTRACT

Methods and systems for transferring ownership of a logical volume in a storage system comprising multiple storage controllers is provided. According to the method, the storage controllers are coupled for communication with a logical volume, wherein at least one storage device coupled with the storage controllers implements the logical volume. The method comprises identifying, at a first storage controller, a second storage controller to receive the logical volume. The method also comprises initiating a transfer of ownership of the logical volume from the first storage controller to the second storage controller by transferring metadata stored in a memory of the first storage controller to the second storage controller, the metadata existing in a native format that describes the configuration of the logical volume on the at least one storage device.

17 Claims, 4 Drawing Sheets

(56) References Cited

U.S. PATENT DOCUMENTS

| | | | |
|---|---|---|---|
| 6,738,872 B2 | 5/2004 | Van Huben et al. | |
| 6,754,739 B1 | 6/2004 | Kessler et al. | |
| 6,944,785 B2 | 9/2005 | Gadir et al. | |
| 7,058,846 B1 | 6/2006 | Kelkar et al. | |
| 7,213,102 B2 | 5/2007 | Buchanan, Jr. et al. | |
| 7,418,550 B2 | 8/2008 | Hetrick et al. | |
| 7,480,941 B1 | 1/2009 | Balasubramaniam et al. | |
| 7,814,065 B2 | 10/2010 | Chan et al. | |
| 8,001,242 B2 | 6/2011 | Benn et al. | |
| 8,015,353 B2 * | 9/2011 | Kabir et al. | 711/114 |
| 8,041,735 B1 | 10/2011 | Lacapra et al. | |
| 8,190,816 B2 | 5/2012 | Balasubramanian | |
| 8,261,003 B2 | 9/2012 | Young et al. | |
| 2002/0103964 A1 | 8/2002 | Igari | |
| 2005/0097324 A1 | 5/2005 | Mizuno | |
| 2005/0125557 A1 | 6/2005 | Vasudevan et al. | |
| 2005/0188421 A1 | 8/2005 | Arbajian | |
| 2005/0240928 A1 | 10/2005 | Brown et al. | |
| 2006/0179170 A1 * | 8/2006 | Kodama | 710/8 |
| 2007/0015589 A1 | 1/2007 | Shimizu | |
| 2007/0067497 A1 | 3/2007 | Craft et al. | |
| 2007/0210162 A1 | 9/2007 | Keen et al. | |
| 2008/0086618 A1 * | 4/2008 | Qi | 711/170 |
| 2009/0119364 A1 | 5/2009 | Guillon | |
| 2009/0222500 A1 | 9/2009 | Chiu et al. | |
| 2010/0185874 A1 | 7/2010 | Robles et al. | |
| 2010/0191873 A1 | 7/2010 | Diamant | |
| 2010/0262772 A1 * | 10/2010 | Mazina | 711/114 |
| 2010/0274977 A1 | 10/2010 | Schnapp et al. | |
| 2011/0178983 A1 | 7/2011 | Bernhard et al. | |
| 2011/0191547 A1 * | 8/2011 | Yoshii et al. | 711/147 |
| 2011/0225371 A1 | 9/2011 | Spry | |
| 2012/0124312 A1 * | 5/2012 | Vemuri et al. | 711/163 |
| 2012/0159646 A1 | 6/2012 | Hong Chi et al. | |
| 2012/0216299 A1 | 8/2012 | Frank | |

OTHER PUBLICATIONS

Ciciani et al. "Analysis of Replication in Distributed Database Systems" IEEE Transactions on Knowledge and Data Engineering, vol. 2 . No. 2 . Jun. 1990.

* cited by examiner

METHODS AND STRUCTURE FOR TRANSFERRING OWNERSHIP OF A LOGICAL VOLUME BY TRANSFER OF NATIVE-FORMAT METADATA IN A CLUSTERED STORAGE ENVIRONMENT

This patent claims priority to U.S. provisional patent application No. 61/532,585, filed on 9 Sep. 2011 and titled "10 Shipping for RAID Virtual Disks Created On A Disk Group Shared Across Cluster," which is hereby incorporated by reference.

BACKGROUND

1. Field of the Invention

The invention relates generally to management of logical volumes in a storage system, and more specifically relates to techniques for quickly transferring ownership of a logical volume from one storage controller to another storage controller.

2. Related Patents

This patent application is related to the following commonly owned United States patent applications, all filed on the same date herewith and all of which are herein incorporated by reference:

U.S. patent application Ser. No. 13/432,131 (filed Mar. 28, 2012), entitled METHODS AND STRUCTURE FOR TASK MANAGEMENT IN STORAGE CONTROLLERS OF A CLUSTERED STORAGE SYSTEM;

U.S. patent application Ser. No. 13/432,213 (filed Mar. 28, 2012), entitled METHODS AND STRUCTURE FOR DIRECT PASS THROUGH OF SHIPPED REQUESTS IN FAST PATH CIRCUITS OF A STORAGE CONTROLLER IN A CLUSTERED STORAGE SYSTEM;

U.S. patent application Ser. No. 13/432,223 (filed Mar. 28, 2012), entitled METHODS AND STRUCTURE FOR LOAD BALANCING OF BACKGROUND TASKS BETWEEN STORAGE CONTROLLERS IN A CLUSTERED STORAGE ENVIRONMENT;

U.S. patent application Ser. No. 13/432,232 (filed Mar. 28, 2012), entitled METHODS AND STRUCTURE FOR IMPLEMENTING LOGICAL DEVICE CONSISTENCY IN A CLUSTERED STORAGE SYSTEM;

U.S. patent application Ser. No. 13/432,238 (filed Mar. 28, 2012), entitled METHODS AND STRUCTURE FOR IMPROVED I/O SHIPPING IN A CLUSTERED STORAGE SYSTEM;

U.S. patent application Ser. No. 13/432,220 (filed Mar. 28, 2012), entitled METHODS AND STRUCTURE FOR MANAGING VISIBILITY OF DEVICES IN A CLUSTERED STORAGE SYSTEM;

U.S. patent application Ser. No. 13/432,150 (filed Mar. 28, 2012), entitled METHODS AND STRUCTURE FOR IMPROVED BUFFER ALLOCATION IN A STORAGE CONTROLLER; and U.S. patent application Ser. No. 13/432,138 (filed Mar. 28, 2012), entitled METHODS AND STRUCTURE FOR RESUMING BACKGROUND TASKS IN A CLUSTERED STORAGE ENVIRONMENT.

3. Discussion of Related Art

In the field of data storage, customers demand highly resilient data storage systems that also exhibit fast recovery times for stored data. One type of storage system used to provide both of these characteristics is known as a clustered storage system.

A clustered storage system typically comprises a number of storage controllers, wherein each storage controller processes host Input/Output (I/O) requests directed to one or more logical volumes. The logical volumes reside on portions of one or more storage devices (e.g., hard disks) coupled with the storage controllers. Often, the logical volumes are configured as Redundant Array of Independent Disks (RAID) volumes in order to ensure an enhanced level of data integrity and/or performance.

A notable feature of clustered storage environments is that the storage controllers are capable of coordinating processing of host requests (e.g., by shipping I/O processing between each other) in order to enhance the performance of the storage environment. This includes intentionally transferring ownership of a logical volume from one storage controller to another. For example, a first storage controller may detect that it is currently undergoing a heavy processing load, and may assign ownership of a given logical volume to a second storage controller that has a smaller processing burden in order to increase overall speed of the clustered storage system. Other storage controllers may then update information identifying which storage controller presently owns each logical volume. Thus, when an I/O request is received at a storage controller that does not own the logical volume identified in the request, the storage controller may "ship" the request to the storage controller that presently owns the identified logical volume.

Figure 1:
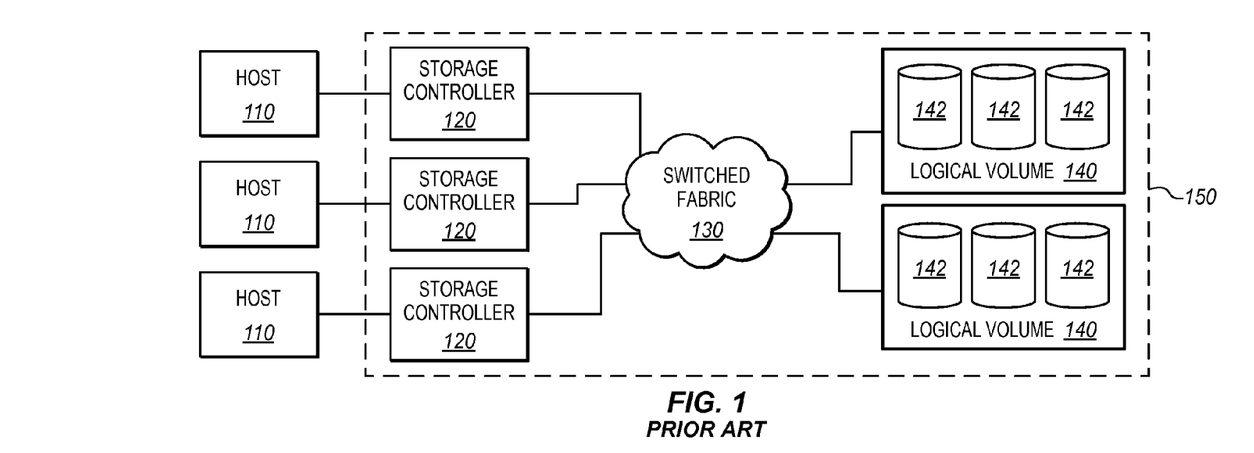
FIG. 1 is a block diagram illustrating an example of a prior art clustered storage system.

FIG. 1 is a block diagram illustrating an example of a prior art clustered storage system 150. Clustered storage system 150 is indicated by the dashed box, and includes storage controllers 120, switched fabric 130, and logical volumes 140. Note that a "clustered storage system" (as used herein) does not necessarily include host systems and associated functionality (e.g., hosts, application-layer services, operating systems, clustered computing nodes, etc.). However, storage controllers 120 and hosts 110 may be tightly integrated physically. For example, storage controllers 120 may comprise Host Bus Adapters (HBA's) coupled with a corresponding host 110 through a peripheral bus structure of host 110. According to FIG. 1, hosts 110 provide I/O requests to storage controllers 120 of clustered storage system 150. Storage controllers 120 are coupled via switched fabric 130 (e.g., a Serial Attached SCSI (SAS) fabric or any other suitable communication medium and protocol) for communication with each other and with a number of storage devices 142 on which logical volumes 140 are stored.

Figure 2:
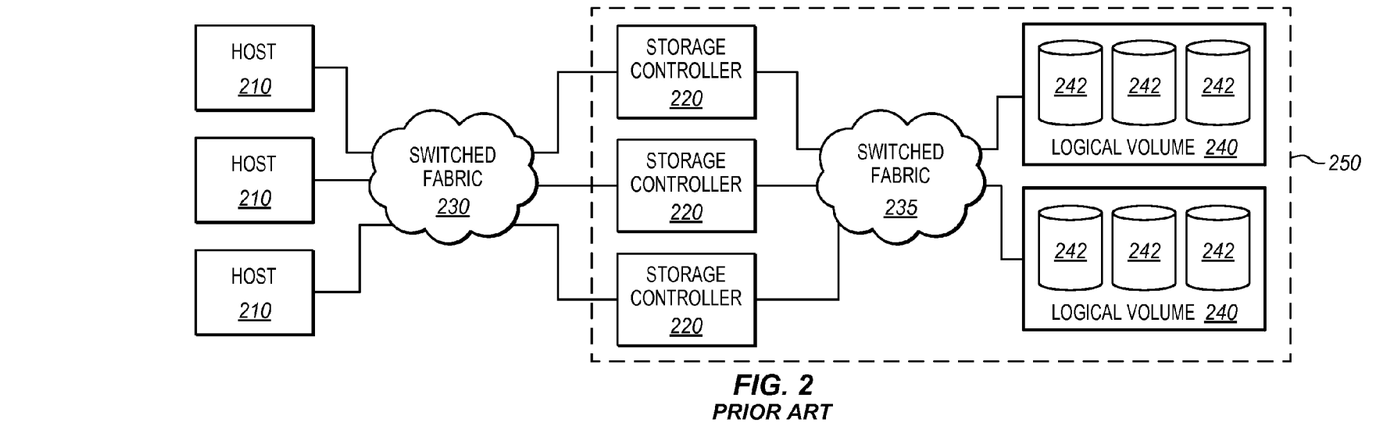
FIG. 2 is a block diagram illustrating another example of a prior art clustered storage system.

FIG. 2 is a block diagram illustrating another example of a prior art clustered storage system 250. In this example, clustered storage system 250 processes I/O requests from hosts 210 received via switched fabric 230. Storage controllers 220 are coupled for communication with storage devices 242 via switched fabric 235, which may be integral with or distinct from switched fabric 230. Storage devices 242 implement logical volumes 240. Many other configurations of hosts, storage controllers, switched fabric, and logical volumes are possible for clustered storage systems as a matter of design choice. Further, in many high reliability storage systems, all the depicted couplings may be duplicated for redundancy. Additionally, the interconnect fabrics may also be duplicated for redundancy.

While clustered storage systems provide a number of performance benefits over more traditional storage systems described above, the speed of a storage system still typically remains a bottleneck to the overall speed of a processing system utilizing the storage system.

For example, in a storage system, data describing logical volumes provisioned on a plurality of storage devices may be stored in Disk Data Format (DDF) on the storage devices. DDF data (or other similar metadata) for a volume describes, for example, physical and virtual disk records for the volumes. Whenever a storage controller assumes ownership of a logical volume, DDF data is processed into a metadata format native to the storage controller. This is beneficial because relevant data is more easily accessible to the storage controller in the native format. Additionally, the native format data is typically a substantially smaller size than the DDF data because it describes fewer logical volumes. Unfortunately, processing the DDF data is an intensive process that delays the processing of incoming host I/O requests directed to the volume. Reading the DDF metadata from the storage devices can consume significant time. Further, the processing to extract data from the read DDF metadata and form desired native format metadata also consumes significant time. This in turn may undesirably reduce the speed of the clustered storage system.

Thus it is an ongoing challenge to enhance the speed at which ownership of a logical volume can be transferred.

SUMMARY

The present invention solves the above and other problems, thereby advancing the state of the useful arts, by providing methods and structure for transferring ownership of a logical volume from one storage controller to another storage controller. Specifically, according to the methods and systems, when ownership of a logical volume is passed from a first storage controller to another storage controller, native-format metadata that describes the configuration of the logical volume is transferred from the first storage controller to the second storage controller. Thus, the second storage controller does not need to read DDF data (or similar metadata) from the storage devices implementing the volume, and the second storage controller has no need to process DDF data into a native format. This in turn increases the speed at which ownership of the logical volume is transferred to the second storage controller.

In one aspect hereof, a method is provided for transferring ownership of a logical volume in a storage system comprising multiple storage controllers, the storage controllers coupled for communication with a logical volume, wherein at least one storage device coupled with the storage controllers implements the logical volume. The method comprises identifying, at a first storage controller, a second storage controller to receive the logical volume. The method also comprises initiating a transfer of ownership of the logical volume from the first storage controller to the second storage controller by transferring metadata stored in a memory of the first storage controller to the second storage controller, the metadata existing in a native format that describes the configuration of the logical volume on the at least one storage device.

Another aspect hereof provides a clustered storage system. The clustered storage system comprises multiple storage controllers coupled for communication with a host system, and coupled for communication with a logical volume. The clustered storage system also comprises at least one storage device coupled with the storage controllers and implementing the logical volume. A first storage controller of the storage system is operable to initiate a transfer of ownership of the logical volume from the first storage controller to a second storage controller by transferring metadata stored in a memory of the first storage controller to the second storage controller, the metadata existing in a native format that describes the configuration of the logical volume on the at least one storage device.

Another aspect hereof provides a storage controller. The storage controller is coupled for communication with a host system, and the storage controller is operable to maintain ownership of a logical volume. The storage controller comprises a communication channel operable to couple for communication with at least one storage device implementing the logical volume, and also comprises a control unit. The control unit is operable to initiate a transfer of ownership of the logical volume to another storage controller by transferring metadata stored in a memory of the storage controller to the other storage controller, the metadata existing in a native format that describes the configuration of the logical volume on the at least one storage device.

DETAILED DESCRIPTION OF THE DRAWINGS

Figure 3:
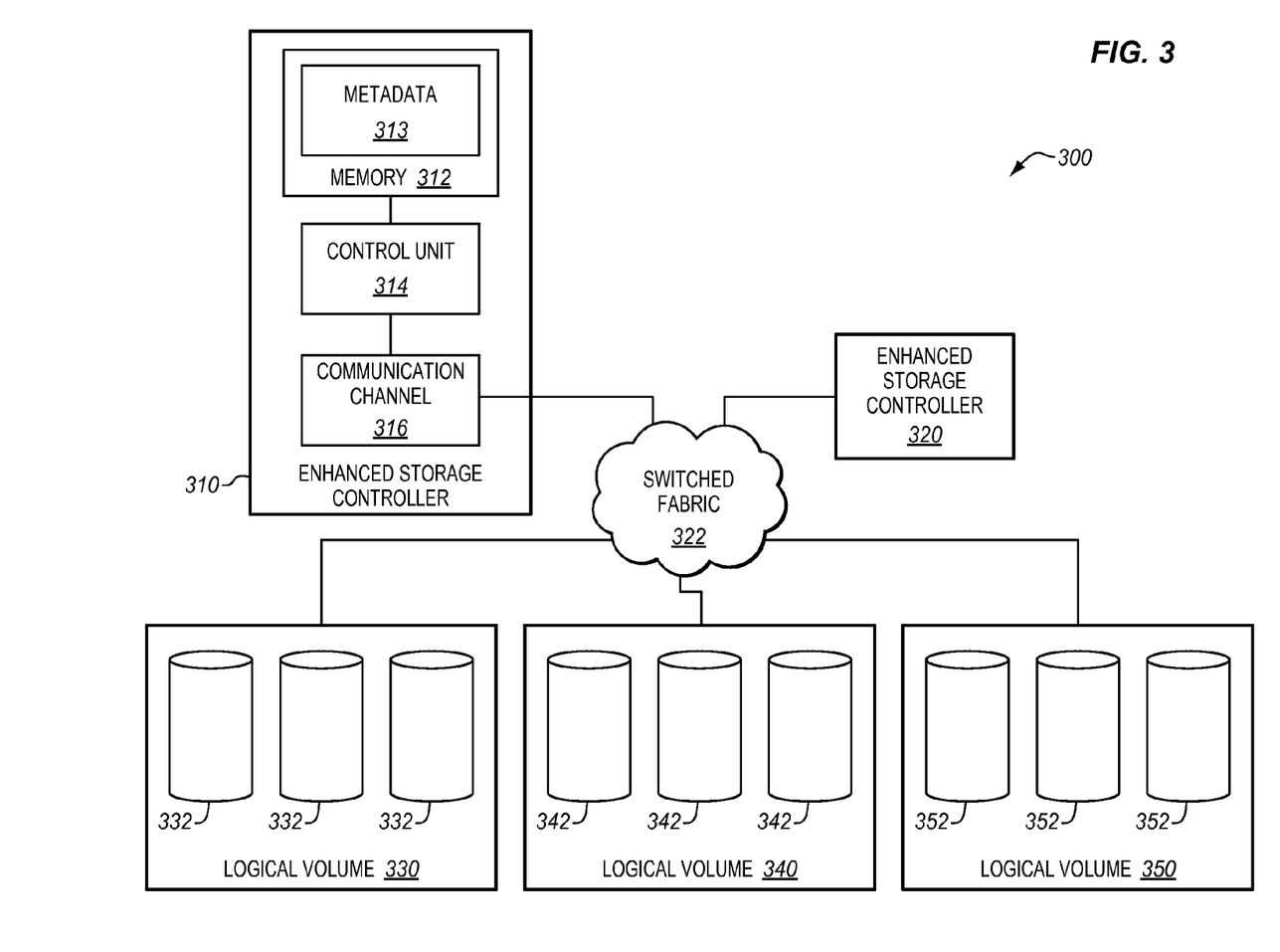
FIG. 3 is a block diagram of an exemplary enhanced storage controller operating at a clustered storage system in accordance with features and aspects hereof.

FIG. 3 is a block diagram of an exemplary enhanced storage controller operating at a clustered storage system 300 in accordance with features and aspects hereof Clustered storage system 300 may be utilized to transfer native-format metadata describing the configuration of a logical volume from one enhanced storage controller to another. According to FIG. 3, clustered storage system 300 includes enhanced storage controller 310 as well as enhanced storage controller 320. Storage controller 310 and 320 are coupled for communication, via switched fabric 322, with one or more logical volumes 330, 340, and 350 provisioned at storage devices 332, storage devices 342, and storage devices 352, respectively. Switched fabric 322 may comprise, for example, components compliant with Serial Attached SCSI (SAS), Fibre Channel, Ethernet, and/or other media or protocols. Storage controllers 310 and 320 may engage in communications with the storage devices of clustered storage system 300, and storage devices 332, 342, and 352 may comprise storage devices that are compliant with a protocol for SAS, Serial Advanced Technology Attachment (SATA), Fibre Channel, ISCSI, etc. Note that the particular arrangement of storage system components is merely intended to be exemplary, and one of ordinary skill in the art will appreciate that the specific arrangement and configuration of storage system devices is merely a matter of design choice.

Further, one of ordinary skill will understand that while logical volumes 330, 340, and 350 are depicted in FIG. 3 as using entirely independent sets of storage devices, in some embodiments certain storage devices will provision portions of multiple logical volumes at once. The storage devices themselves may comprise any known system for storing data utilized by a computer system. For example, the storage devices may comprise magnetic disk drives, solid state drives, optical media, etc.

Enhanced storage controller 310 comprises control unit 314, communication channel 316, and memory 312 storing metadata 313. Metadata 313 comprises native-format metadata for storage controller 310 that describes the configuration of one or more logical volumes owned by storage controller 310. This native-format metadata may include information extracted from Disk Data Format (DDF) data for the logical volumes owned by storage controller 310, and may be dynamically generated based on DDF data for the logical volumes maintained at storage devices of clustered storage system 300.

Control unit 314 is operable to manage the operations of storage controller 310. Control unit 314 may be implemented, for example, as custom circuitry, as a special or general purpose processor executing programmed instructions stored in an associated program memory, or some combination thereof. Managing the operations of storage controller 310 includes processing host I/O requests directed to logical volumes 330, 340, and 350 implemented on storage devices 332, 342, and 352, respectively. Control unit 314 utilizes communication channel 316 in order to communicate with the storage devices implementing logical volumes 330, 340, and 350. Communication channel 316 may comprise, for example, a channel compliant with protocols for SAS, Fibre Channel, Ethernet, etc.

Control unit 314 is further operable to determine that it is appropriate to transfer ownership of a logical volume to storage controller 320. For example, the decision to transfer ownership may occur based on a load balancing determination made when control unit 314 determines that the workload (e.g., an amount of queued host I/O commands) at storage controller 310 is greater than the workload at storage controller 320. In another example, the transfer of ownership may occur under any condition which may potentially impact the availability of data for the logical volume. For example, conditions such as high temperature or component failure (e.g., a battery below a minimum charge level) may indicate that storage controller 310 is likely to experience an unexpected failure and therefore trigger a transfer. In a still further example, the transfer of ownership may occur as a part of a planned shutdown of storage controller 310. A shutdown may be planned, for example, in order to update firmware resident on storage controller 310, to replace hardware components (e.g., a battery) for storage controller 310, etc. When a planned shutdown of a storage controller occurs, all volumes of the controller may be transferred to the other controllers of the system. For example, all volumes may be transferred to a single other storage controller, or the volumes may be distributed to a variety of other storage controllers. The following section describes how ownership of a single logical volume may be transferred between controllers. However, each of multiple volumes may be transferred in a similar fashion to that described below for a single logical volume. Further, multiple logical volumes may be transferred as part of a parallel or serial process.

During the transfer of ownership of a logical volume, control unit 314 is enhanced to provide native-format metadata 313 to storage controller 320 via channel 316 or any other suitable channel (e.g., a separate channel dedicated to inter-controller communications in system 300). The native-format metadata describes the configuration of the logical volume, and is native-format in that it exists in a format such that it is immediately usable by the receiving controller without requiring access to the original DDF metadata. Further, the "native" format may be significantly smaller than the DDF metadata in that a controller may condense the complete set of DDF metadata to only that information required for the controller to function. Upon acquiring the metadata, storage controller 320 is operable to assume ownership and manage the operations of the logical volume of clustered storage system 300 that used to be managed by storage controller 310. Specifically, storage controller 320 is operable to integrate metadata 313 into existing metadata structures used to manage logical volumes. In this manner, storage controller 320 does not need to acquire (or process) DDF data from storage devices 332, 342, or 352 before assuming ownership of the volume. Instead, native-format metadata for managing the logical volume is immediately available.

Using enhanced storage controllers 310 and 320 provides numerous benefits in terms of processing speed. For example, because storage devices are not accessed by storage controller 320 to build metadata for the transferred logical volume, the availability of the storage devices is increased. Similarly, because storage controller 320 does not need to actively generate native-format metadata from DDF data, storage controller 320 also experiences increased availability, thereby reducing the period during which host I/O requests are queued.

Figure 4:
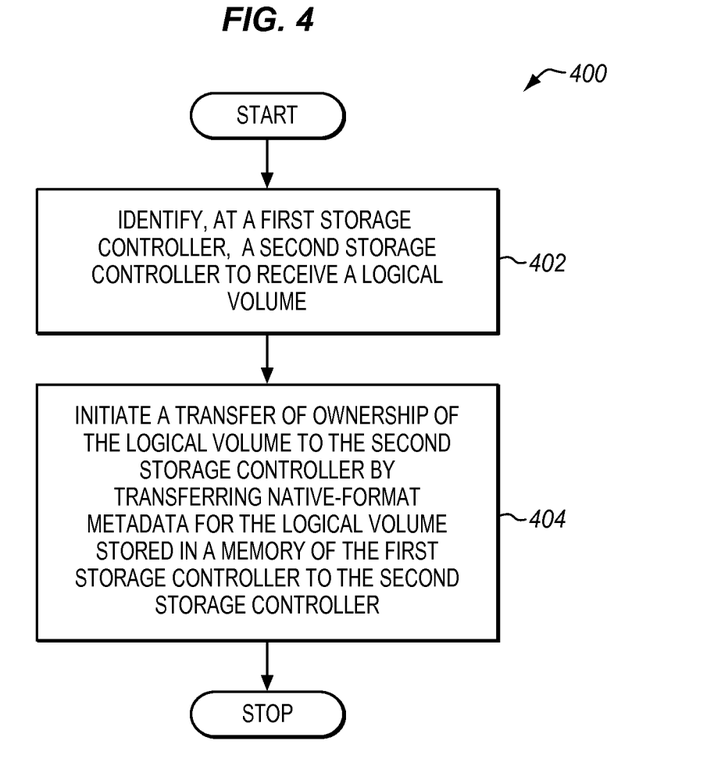
FIG. 4 is a flowchart describing an exemplary method in accordance with features and aspects hereof to enhance the speed of transferring ownership of a logical volume.

FIG. 4 is a flowchart describing an exemplary method 400 in accordance with features and aspects hereof to enhance the speed of transferring ownership of a logical volume. The method of FIG. 4 may be operable in a clustered storage system such as described above with regard to FIG. 3. Assume for this embodiment that a first storage controller maintains ownership of a logical volume, but has determined that it is appropriate to transfer ownership of the volume to a second storage controller. For example, the determination could be made based on a current processing load at the controllers. In another example, the determination could be made based on receiving a request at the first storage controller (e.g., from a host or other component) to initiate a planned shutdown of the first storage controller.

Step 402 includes identifying, at the first storage controller, a second storage controller to receive the logical volume. The second storage controller may be identified in a number of ways. For example, the second storage controller may be identified/selected because it is currently experiencing little in the way of processing load. In another example, a received request at the first storage controller explicitly indicates that the logical volume should be transferred to the second storage controller. In a still further example, the second storage controller is identified because it manages a smaller number of logical volumes and/or storage devices than the first storage controller. Whatever technique is used, the second storage controller is typically chosen/identified because transferring ownership of the logical volume will result in a processing benefit at the first and/or second storage controllers or will ensure continued availability of the data for the logical volume.

Step 404 comprises transferring ownership of the logical volume to the second storage controller. The transfer includes the first storage controller transferring native-format metadata for the logical volume from a memory of the first storage controller to the second storage controller. The second storage controller assumes ownership of the transferred logical volume. The first storage controller then quiesces processing by shipping host I/O requests directed to the logical volume to the second storage controller.

Figure 5:
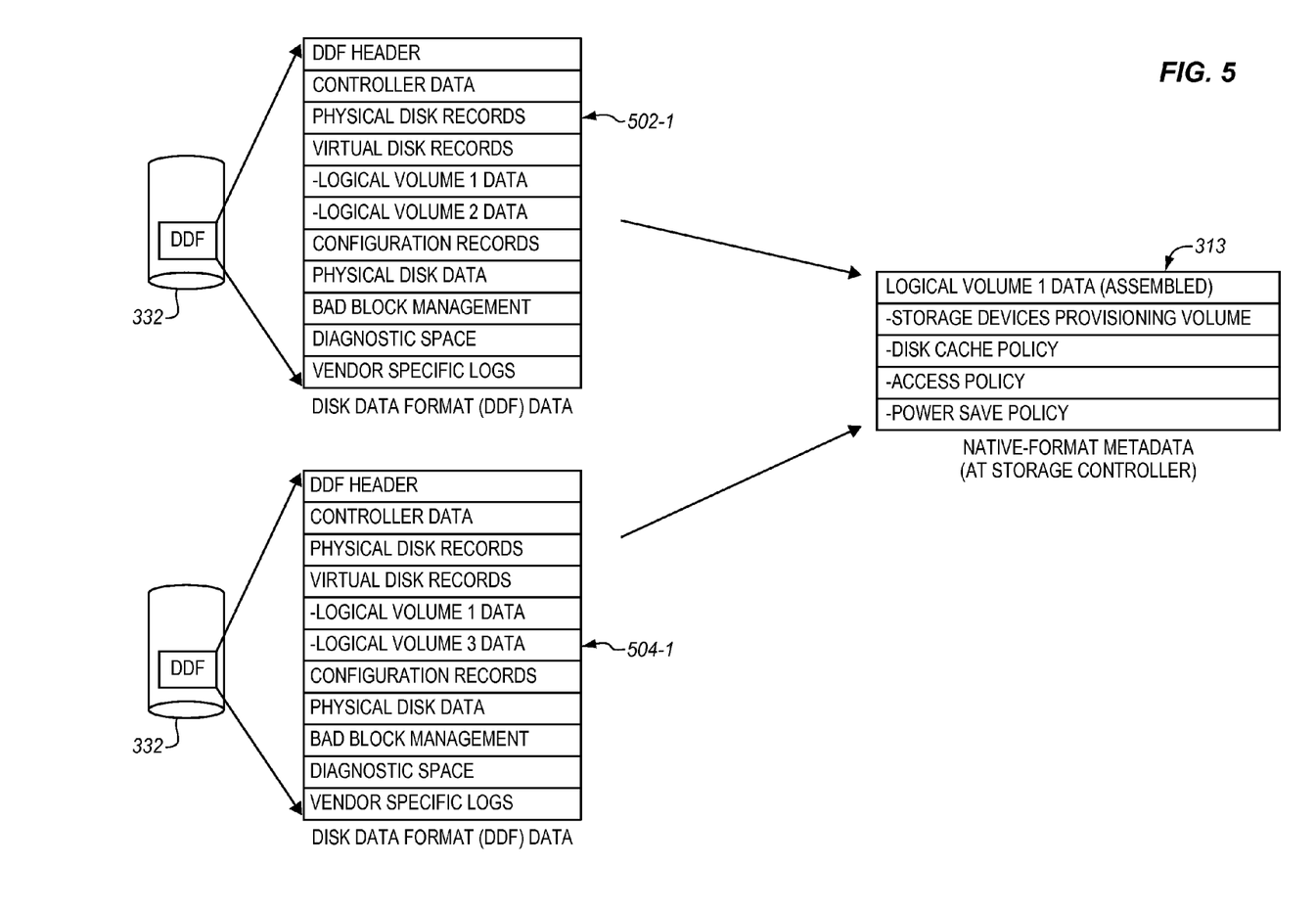
FIG. 5 is a block diagram illustrating exemplary Disk Data Format (DDF) metadata as well as native-format metadata for a storage controller in accordance with features and aspects hereof.

FIG. 5 is a block diagram illustrating exemplary Disk Data Format (DDF) data as well as native-format metadata for a storage controller in accordance with features and aspects hereof.

FIG. 5 depicts two storage devices 332. A first storage device 332 includes DDF data 502-1 describing the configuration of logical volumes residing thereon. Similarly, a second storage device 332 includes DDF data 504-1 describing logical volumes provisioned at second storage device 332. Both the first and second storage device 332 include information describing "logical volume 1." The DDF standards are described in detail in the Common RAID Disk Data Format Specification of the Storage Networking Industry Association (SNIA) (e.g., version 2.0, revision 19, published 27 Mar. 2009, herein incorporated by reference). The configuration information for each logical volume (e.g., "virtual disk" as discussed in the DDF standards) includes a mapping of logical block addresses for the volume to physical block addresses on the storage device.

Simply copying DDF data from each storage device into a memory of a storage controller would be undesirable for a number of reasons. First, the DDF data is likely to include data describing multiple logical volumes, and the storage controller assuming ownership may only need data relating to one of the volumes being transferred. Additionally, DDF data stored across multiple storage devices is likely to include repetitive configuration data describing the logical volumes (i.e., certain configuration data for the logical volume such as the RAID configuration of the volume may be repeated in DDF data for each storage device). For these reasons, it is generally desirable for a storage controller transferring ownership in accordance with features and aspects hereof to utilize custom, native-format metadata 313 for storing logical volume configuration information.

In order to generate native-format metadata that may be transferred between controllers, a storage controller may engage in the following processes. The entire DDF portion of each storage device owned by the storage controller may be analyzed. Virtual disk (i.e., logical volume) records may be read from the DDF sections of each storage device and then merged together to form a final configuration structure. The merging process itself may utilize multiple iterations through the DDF data to derive a native format for the logical volume configuration information. This is because each DDF section of each storage device has some information relevant for defining properties of the logical volume.

Native-format metadata 313 includes a specialized memory structure that describes the logical volumes and storage devices managed by the storage controller. For example, the native-format metadata may describe the RAID configurations of the storage devices that are managed by the storage controller (e.g., several storage devices may implement a RAID 5 configuration, several other storage devices may implement a RAID 0 configuration, etc.). This information may describe the number of RAID configurations, and for each set of storage devices implementing a RAID configuration: an identifier for the set of storage devices, identifiers for each storage device in the RAID configuration, total available space at the RAID configuration, remaining free space at the RAID configuration, a physical location (e.g., within an enclosure) at which to find each storage device of the RAID configuration, etc.

The native-format metadata may further describe the logical volumes managed by the storage controller. For example, the metadata may uniquely identify each logical volume, indicate a cache policy for the logical volume (e.g., write-back or write-through), describe an access policy for the logical volume (e.g., read/write, read, or write—the access policy may vary as a host-by-host determination), a disk cache policy for storage devices provisioning the volume (i.e., whether the storage devices are allowed to utilize their individualized caches when storing data—using caches may speed up transfer speeds, but may also make the system more vulnerable to transfer errors if a power failure occurs), and whether a power save policy is allowed for the storage devices (i.e., whether the storage devices provisioning the logical volume are allowed to go idle, thereby saving power but reducing performance). Further, the metadata may include information describing hot spares owned by the storage controller, whether the spares are reserved for specific RAID configurations or logical volumes, etc.

The following illustrates a memory structure that may be utilized to store the metadata:

```
typedef struct _MR_CONFIG_DATA {
    U32     size;           // total size of the metadata in memory
    U16     arrayCount;     // number of RAID configurations ("arrays") owned
    U16     arraySize;      // size of each metadata array entry in memory
    U16     logDrvCount;    // number of logical drives in for a RAID configuration
    U16     logDrvSize;     // size of each metadata logical volume entry in memory
    U16     sparesCount;    // count of spare storage devices owned by controller
    U16     sparesSize;     // size of each metadata spare entry in memory
    U8      reserved[16];   // reserved for future use - pad to 32 bytes
    MR_ARRAY    array[1];       // set of entries of RAID configuration metadata
    MR_LD_CONFIG ld[1];         // set of entries of logical volume metadata
    MR_SPARE    spare[1];       // set of entries of spare metadata
}
```

Wherein the information is defined according to the C, C++, and/or C# family of languages, and wherein the term U32, U16, etc. indicates an unsigned integer of 32 bits, 16 bits, etc.

It may be immediately appreciated that the native-format metadata is stored at a memory of the storage controller and does not include duplicate data for a single logical volume. Furthermore, the native-format metadata does not include information describing logical volumes not owned by the storage controller. As the native-format metadata at the storage controller is smaller in size than the DDF data and more easily accessed, it is also easier to parse. Thus, using native-format metadata results in a substantial performance boost.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A storage controller for coupling communicatively with a host system, the storage controller operable to maintain ownership of a logical volume, the storage controller comprising:
    a communication channel operable to couple for communication with at least one storage device implementing the logical volume; and a control unit operable to initiate a transfer of ownership of the logical volume to another storage controller by transferring metadata stored in a memory of the storage controller to the other storage controller, the metadata existing in a native format that describes the configuration of the logical volume on the at least one storage device, wherein the control unit is further operable to generate the metadata by selectively acquiring Disk Data Format (DDF) structures kept at the at least one storage device provisioning the logical volume and re-formatting the acquired DDF structures into a native format distinct from DDF.

2. The storage controller of claim 1, wherein the control unit is further operable to perform the transfer of ownership of the logical volume during a planned shutdown of the storage controller.

3. The storage controller of claim 2, wherein the control unit is further operable to quiesce presently queued host Input/Output (I/O) requests directed to the logical volume by shipping the queued host I/O requests to the other storage controller during the planned shutdown.

4. The storage controller of claim 1, wherein the metadata comprises information describing at least one of a number of storage devices used to provision the logical volume, a Redundant Array of Independent Disks (RAID) level of the logical volume, and a partitioning of the logical volume on the at least one storage device.

5. The storage controller of claim 1, further comprising a Serial Attached SCSI (SAS) communication channel coupling the storage controller to the other storage controller.

6. A clustered storage system comprising:

multiple storage controllers coupled for communication with a host system, and coupled for communication with a logical volume; and at least one storage device coupled with the storage controllers and implementing the logical volume, wherein a first storage controller is operable to initiate a transfer of ownership of the logical volume from the first storage controller to a second storage controller by transferring metadata stored in a memory of the first storage controller to the second storage controller, the metadata existing in a native format that describes the configuration of the logical volume on the at least one storage device, wherein the first storage controller is further operable to generate the metadata by selectively acquiring Disk Data Format (DDF) structures kept at the at least one storage device provisioning the logical volume and re-formatting the acquired DDF structures into a native format distinct from DDF.

7. The clustered storage system of claim 6, wherein the first storage controller is further operable to perform the transfer of ownership of the logical volume during a planned shutdown of the first storage controller.

8. The clustered storage system of claim 7, wherein the first storage controller is further operable to quiesce presently queued host Input/Output (I/O) requests directed to the logical volume by shipping the queued host I/O requests to the second storage controller during the planned shutdown.

9. The clustered storage system of claim 6, wherein the second storage controller is operable to process host Input/Output (I/O) requests directed to the logical volume immediately after receiving the metadata in the native format.

10. The clustered storage system of claim 6, further comprising:

the second storage controller, wherein the second storage controller is operable to acquire the metadata in the native format, and is further operable to manage the logical volume using the native-format metadata without processing Disk Data Format (DDF) structures located at the at least one storage device.

11. The clustered storage system of claim 6, wherein the metadata comprises information describing at least one of a number of storage devices used to provision the logical volume, a Redundant Array of Independent Disks (RAID) level of the logical volume, and a partitioning of the logical volume on the at least one storage device.

12. A method for transferring ownership of a logical volume in a storage system comprising multiple storage controllers, the storage controllers coupled for communication with a logical volume, wherein at least one storage device coupled with the storage controllers implements the logical volume, the method comprising:

identifying, at a first storage controller, a second storage controller to receive the logical volume;

initiating a transfer of ownership of the logical volume from the first storage controller to the second storage controller by transferring metadata stored in a memory of the first storage controller to the second storage controller, the metadata existing in a native format that describes the configuration of the logical volume on the at least one storage device;

generating the metadata at the first storage controller by selectively acquiring Disk Data Format (DDF) structures kept at the at least one storage device provisioning the logical volume; and re-formatting the acquired DDF structures into a native format distinct from DDF.

13. The method of claim 12, further comprising transferring ownership of the logical volume during a planned shutdown of the first storage controller.

14. The method of claim 13, further comprising quiescing presently queued Input/Output (I/O) requests from a host system directed to the logical volume by shipping the queued host I/O requests to the second storage controller during the planned shutdown of the first storage controller.

15. The method of claim 12, further comprising acquiring the metadata in the native format at the second storage controller; and managing the logical volume at the second storage controller using the native-format metadata without processing Disk Data Format (DDF) structures located at the at least one storage device.

16. The method of claim 12, further comprising processing Input/Output (I/O) requests from a host system directed to the logical volume at the second storage controller immediately after the second storage controller receives the metadata in the native format.

17. The method of claim 12, wherein the metadata comprises information describing the number of storage devices used to provision the logical volume, a Redundant Array of Independent Disks (RAID) level of the logical volume, and a partitioning of the logical volume on the at least one storage device.

* * * * *